(12) United States Patent
Hwang et al.

(10) Patent No.: US 8,335,903 B2
(45) Date of Patent: Dec. 18, 2012

(54) METHOD AND SYSTEM FOR PROCESSING ACCESS TO DISK BLOCK

(75) Inventors: Joo-young Hwang, Suwon-si (KR); Jae-min Ryu, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 12/053,246

(22) Filed: Mar. 21, 2008

(65) Prior Publication Data

US 2008/0235474 A1 Sep. 25, 2008

(30) Foreign Application Priority Data

Mar. 21, 2007 (KR) .................. 10-2007-0027804

(51) Int. Cl.
*G06F 12/00* (2006.01)
(52) U.S. Cl. ............... 711/163; 711/119; 711/E12.095
(58) Field of Classification Search .............. 711/163, 711/133
See application file for complete search history.

(56) References Cited

U.S. PATENT DOCUMENTS

| | | | |
|---|---|---|---|
| 5,043,876 A | 8/1991 | Terry | |
| 5,889,952 A * | 3/1999 | Hunnicutt et al. ............ 709/219 |
| 5,974,424 A | 10/1999 | Schmuck et al. | |
| 6,073,216 A * | 6/2000 | McDonald et al. ............ 711/141 |
| 2001/0032297 A1* | 10/2001 | Morikawa et al. ............ 711/133 |
| 2003/0154236 A1 | 8/2003 | Dar et al. | |
| 2003/0188109 A1* | 10/2003 | Yamasaki ..................... 711/147 |
| 2004/0019891 A1* | 1/2004 | Koenen ......................... 718/102 |
| 2004/0122917 A1 | 6/2004 | Menon et al. | |
| 2005/0044140 A1 | 2/2005 | Urabe | |
| 2006/0174069 A1* | 8/2006 | Shaw et al. ................... 711/146 |

FOREIGN PATENT DOCUMENTS

| | | |
|---|---|---|
| JP | 200570965 A | 3/2005 |
| KR | 20020043364 A | 6/2002 |
| KR | 20030041277 A | 5/2003 |
| KR | 1020040073630 A | 8/2004 |
| KR | 1020050102522 A | 10/2005 |
| KR | 1020050114028 A | 12/2005 |

* cited by examiner

*Primary Examiner* — Hashem Farrokh
*Assistant Examiner* — Larry Mackall
(74) *Attorney, Agent, or Firm* — Sughrue Mion, PLLC

(57) ABSTRACT

Provided are a method and a system for processing an access to a disk block. The system receives a disk block access request from an OS domain, determines whether the OS domain is permitted to access a disk block with reference to a predetermined block table and processes disk block access of the OS domain according to the determination result. Accordingly, OS domains can share caches without having data copy through memory access control in a virtual machine monitor environment. Furthermore, a device domain controls access to a disk drive so that data corruption can be prevented.

20 Claims, 7 Drawing Sheets

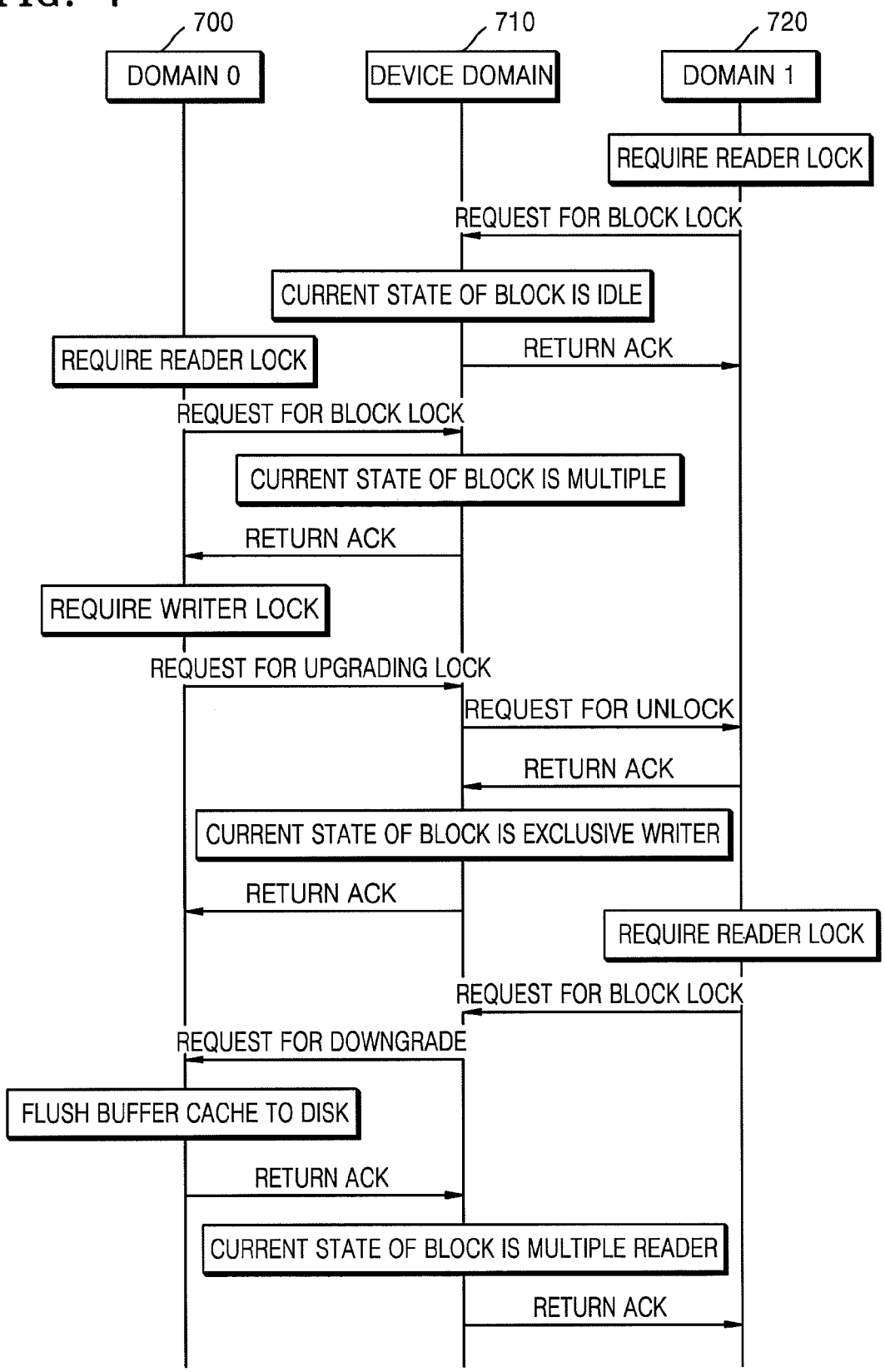

METHOD AND SYSTEM FOR PROCESSING ACCESS TO DISK BLOCK

CROSS-REFERENCE TO RELATED PATENT APPLICATION

This application claims the benefit of Korean Patent Application No. 10-2007-0027804, filed on Mar. 21, 2007, in the Korean Intellectual Property Office, the disclosure of which is incorporated herein in its entirety by reference.

BACKGROUND OF THE INVENTION

1. Field of the Invention

The present invention relates to a method and a system for processing an access to a disk block, and more particularly, to a method and a system for processing accesses of different operating system (OS) domains to a disk block in an environment using a virtual machine monitor (VMM).

2. Description of the Related Art

A computer file system maintains and manages files and data stored in the files such that the files and the data can be easily stored and found. While the file system uses physical storage spaces such as hard disks or CD-ROMs, as storage units, a file system such as a network file system and a shared disk file system may use a virtual interface for accessing files existing on a network as a storage unit.

File systems are classified into a disk file system, a network file system and a file system for special purpose. The disk file system is designed to store files in a data storage unit, particularly, a disk drive connected to a computer.

FIG. 1 is a diagram for explaining a disk access in a conventional network file system. The network file system allows a disk drive of a remote node to be accessed as if it is a local disk. Referring to FIG. 1, data of a disk drive 120 is copied to a buffer cache 111 on a main memory of a node 1 110 corresponding to a remote node, transmitted to a node 0 100 through a network 130 and stored in a buffer cache 101 on a main memory of the node 0 100. This data is provided to an application. However, the network file system has a large overhead with respect to data copy because data on the disk drive can be accessed only through a remote node, that is, the node 1 110.

The shared disk file system enables an access to disk drives directly connected to a storage area network (SAN) or a TCP/IP network. When a plurality of nodes share the same disk drive, a technique for maintaining data consistency is required. Each node has a buffer cache and allows only one copy for the same disk block for data consistency. To achieve this, block lock is required before the disk drive is accessed. The block lock is obtained using an additional server node managing block lock or a block lock mechanism provided by a disk.

The shared disk file system has a data copy overhead smaller than that of the network file system because data of a disk drive is directly copied to a buffer cache of a node that wants to access the data without help of other nodes.

A virtual machine is an abstracted hardware structure that allows various operating systems to be executed without being affected by hardware. Various operating systems and software can be executed irrespective of hardware and multiple operating systems can be executed in a single computer by using the virtual machine. For example, a single hardware element simultaneously executes a plurality of virtual systems such that it looks like a plurality of systems exist.

A conventional system has a structure in which an operating system controls hardware to allow an application to use the hardware through a standard application programming interface (API) and the application is operated on the operating system. In a virtual machine structure, however, an operating system is executed while it mistakes a virtual hardware environment provided by a virtual machine monitor for substantial hardware and an application uses virtual hardware through an API provided by the operating system.

Conventional disk file systems including the network file system and the shared disk file system are used to share disk data between different computing devices and, when they are applied to a virtual machine monitor environment, overhead of data copy and integrity of data cannot be secured.

Specifically, the network file system searches a buffer cache of a remote node when data is missed in a buffer cache and moves the data to a local node through a network when the data is hit in the buffer cache of the remote node. When the network file system is applied to a virtual machine monitor environment, however, data is copied between different operating system (OS) domains at the same node. Furthermore, the shared disk file system cannot control direct access of nodes to a disk drive, and thus arbitrary data recorded on a disk can be overwritten to generate data corruption.

SUMMARY OF THE INVENTION

The present invention provides a method and a system for processing OS domain access to a disk block in an environment in which that at least one OS domain is executed on a virtual machine monitor.

According to an aspect of the present invention, there is provided a method for processing OS domain access to a disk block in an environment in which at least one OS domain is executed on a virtual machine monitor, the method comprising: receiving a disk block access request from a predetermined OS domain; determining whether the OS domain is permitted to access the disk block with reference to a predetermined block table; and processing an access of the OS domain to the disk block according to the determination result.

According to another aspect of the present invention, there is provided a method of processing a disk block access, the method comprising: an OS domain requesting from a device domain access to a disk block; the device domain requesting another OS domain to check whether a buffer cache thereof caches the disk block with reference to a predetermined block table; the device domain requesting a virtual machine monitor to update a page table of the OS domain such that the OS domain and the OS domain caching the disk block in the buffer cache thereof share the page of the disk block according to the checking result; and the device domain returning the address of the shared page of the disk block to the OS domain.

According to another aspect of the present invention, there is provided a system for processing an OS domain to access a disk block in an environment in which at least one OS domain is executed on a virtual machine monitor, the system comprising a device domain receiving a disk block access request from a predetermined OS domain, determining whether the OS domain is permitted to access the disk block with reference to a predetermined block table, and processing an access of the OS domain to the disk block according to the determination result.

BRIEF DESCRIPTION OF THE DRAWINGS

The above and other features and advantages of the present invention will become more apparent by describing in detail exemplary embodiments thereof with reference to the attached drawings in which:

FIG. 7 illustrates a signal flow for explaining block lock according to an embodiment of the present invention.

DETAILED DESCRIPTION OF THE INVENTION

Figure 1:
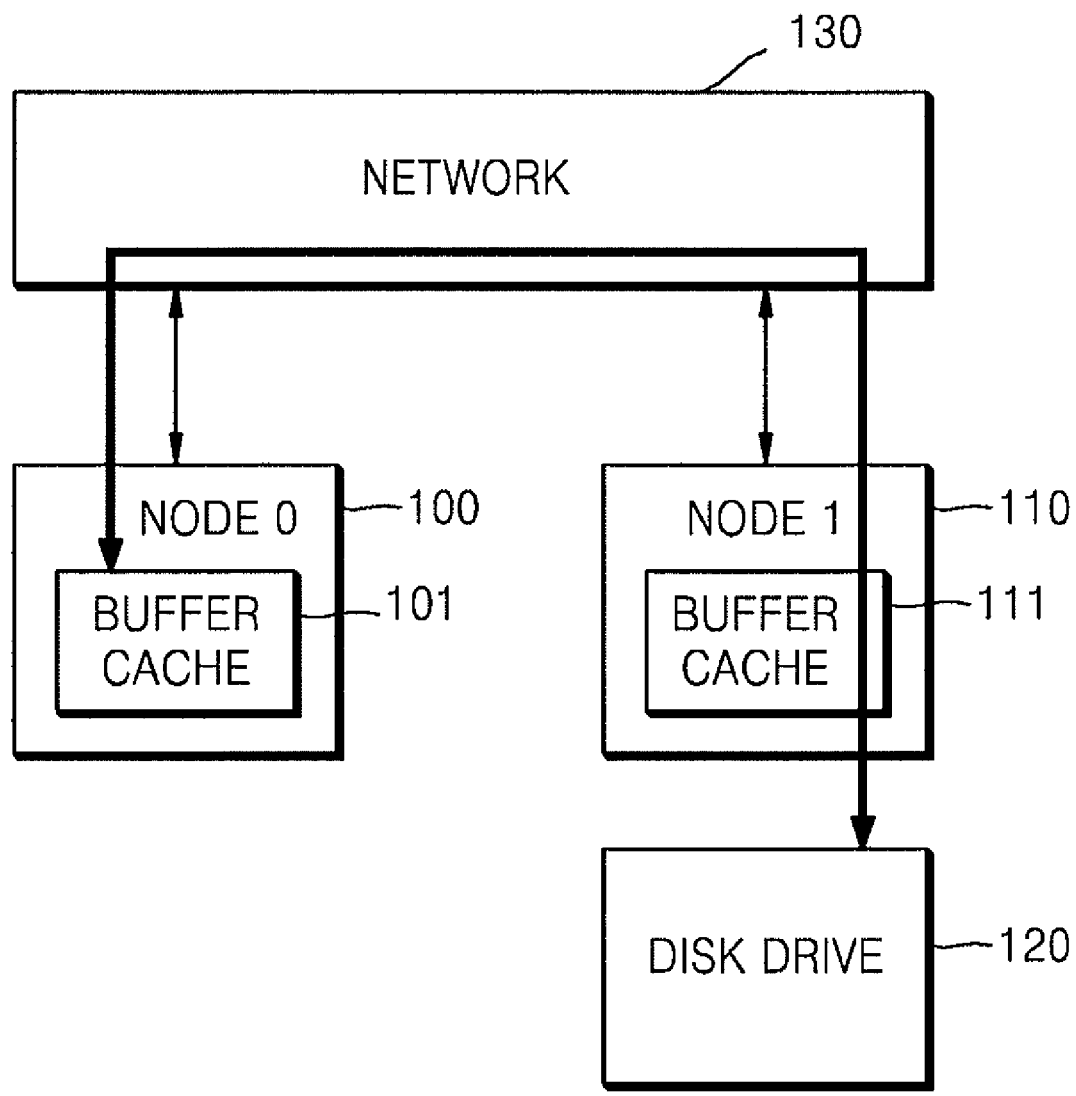
FIG. 1 is a diagram for explaining disk access in a conventional network file system.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 2:
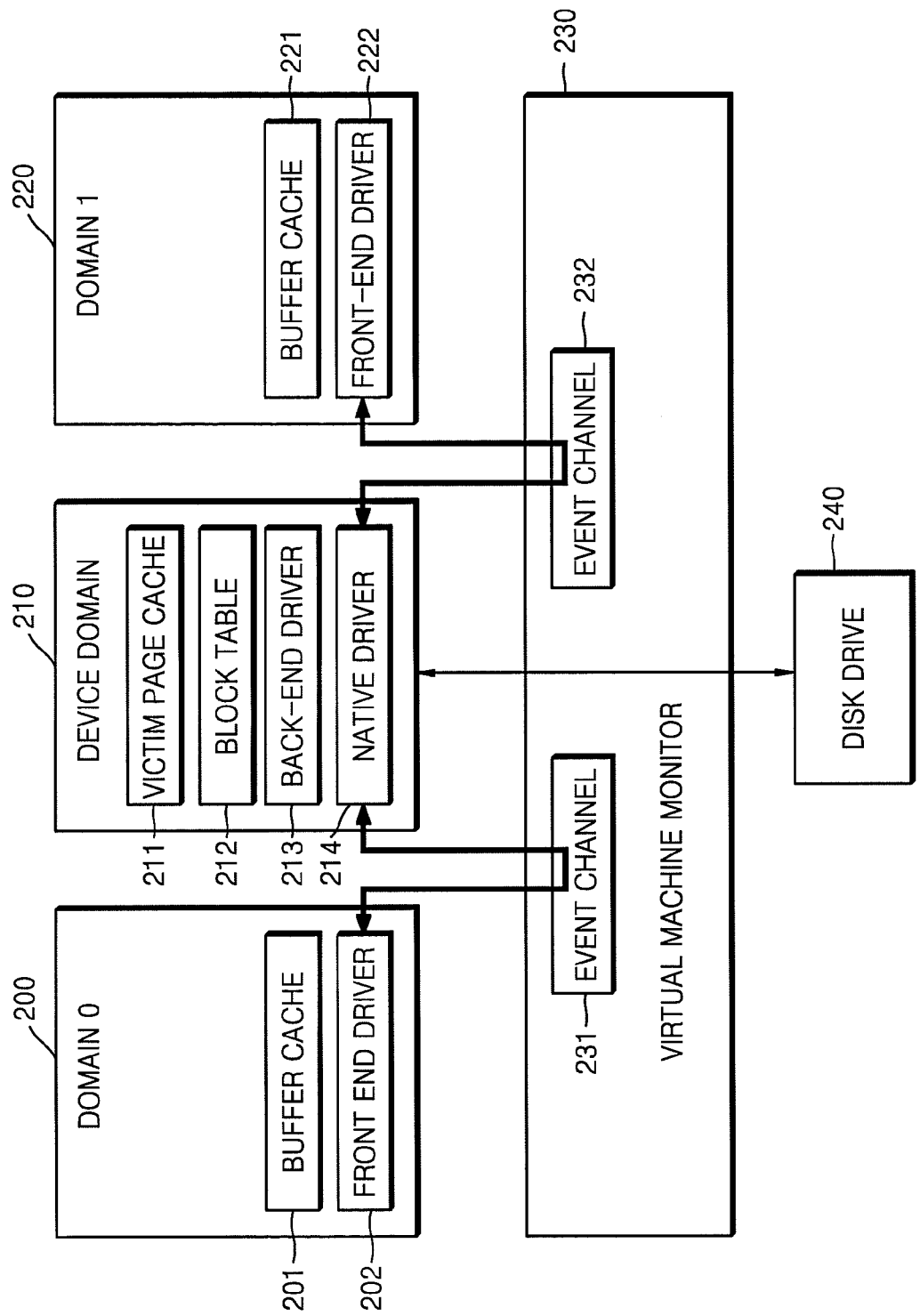
FIG. 2 is a block diagram of a system for processing an OS domain to access a disk block in an environment in which at least one OS domain is executed on a virtual machine monitor according to an embodiment of the present invention.

FIG. 2 is a block diagram of a system for processing OS domain access to a disk block in an environment in which at least one OS domain is executed on a virtual machine monitor according to an embodiment of the present invention. Referring to FIG. 2, the system includes a domain 0 200, a device domain 210, a domain 1 220, a virtual machine monitor 230, and a disk drive 240. The domain 0 and the domain 1 correspond to different OS domains. For example, the domain 0 is Windows OS and the domain 1 is Linux OS. For convenience, the domain 0 and the domain 1 are OS domains in the present embodiment. While two OS domains are illustrated in FIG. 2, the number and kind of operating systems are not limited thereto.

The domain 0 200 and the domain 1 220 respectively include buffer caches 201 and 221 and front-end drivers 202 and 222. The buffer caches 201 and 221 are memories used for disk buffering and they are used in most OSs.

The front-end drivers 202 and 222 are paired with a back-end driver 213 of the device domain 210. The front-end drivers 202 and 222 communicate with the back-end driver 213 of the device domain 210 through event channels 231 and 232 of the virtual machine monitor 230 in order to access the disk driver 240.

The device domain 210 receives a disk input/output request or a block lock request from the domain 0 200 and domain 1 220, processes the received request and returns the processing result.

Specifically, when the device domain 210 receives the disk input/output request from the domain 0 200 that is not permitted, the device domain 210 returns an error signal to the domain 0 200. When receiving the disk input/output request that is permitted, the device domain 210 confirms whether the requested disk block exists in the buffer cache 221 of the domain 1 220 and directly accesses the disk drive 240 when the requested disk block does not exist in the buffer cache 221. When the device domain 210 directly accesses the disk drive 240, the front-end driver 202 of the domain 0 200 communicates with the back-end driver 213 of the device domain 210 through the event channel 231 of the virtual machine monitor 230 and a native driver 214 of the device domain 210 accesses the disk drive 240 to perform disk input/output.

A lock request transmitted from the domain 0 200 and the domain 1 220 to the device domain 210 includes Get_Reader_Lock, Get_Exclusive_Writer_Lock, Put_Reader_Lock, Put_Exclusive_Writer_Lock, Downgrade_to_Reader_Lock, and Upgrade_to_Exclusive_Writer_Lock. For example, Get_Reader_Lock is a request for obtaining permission to read a block of a disk. When the device domain 210 receives this request, the device domain 210 searches a block table 212 for a corresponding block table entry. The block table entry includes a field representing whether the requested lock of the corresponding block is permitted, and the device domain 210 confirms whether the requested lock can be permitted with reference to the field. When the requested lock can be permitted, the device domain 210 updates the field to correct the block table entry and returns the result to the domain that transmitted the request.

The device domain 210 includes a victim page cache 211. When a page is required to be replaced in an arbitrary OS domain, for example, the OS domain requests the device domain 210 to re-register the block table 212, and the device domain 210 allocates a page to the victim page cache 211 and copies the contents of the page to be replaced to the allocated page of the victim page cache 211.

The virtual machine monitor 230 allows the disk drive 240 to be used by a plurality of OS domains, that is, the domain 0 200 and the domain 1 220.

In general, a virtual machine monitor is a middleware software layer and arbitrates access to a physical host platform among a plurality of different guest operating systems such that the different guest operating systems share the physical host platform. The virtual machine monitor provides a virtual platform to each of the guest operating systems to allow the guest operating system constructs a virtual machine. Furthermore, the virtual machine monitor manages generation, extinction and transplanting of a virtual machine between a platform and a user software environment.

In the present embodiment, the virtual machine monitor 230 provides the event channels 231 and 232 such that the front-end drivers 202 and 222 of the domains 200 and 220 communicate with the back-end driver 213 of the device domain 210 through the event channels 231 and 232. Furthermore, the virtual machine monitor 230 manages physical pages of memories of the domains 200 and 220. For example, the virtual machine monitor 230 manages a page table through a memory management unit. The memory management unit is a hardware element managing a virtual memory system and has a small-capacity memory for maintaining a table required to map a virtual memory to a substantial memory.

Figure 3:
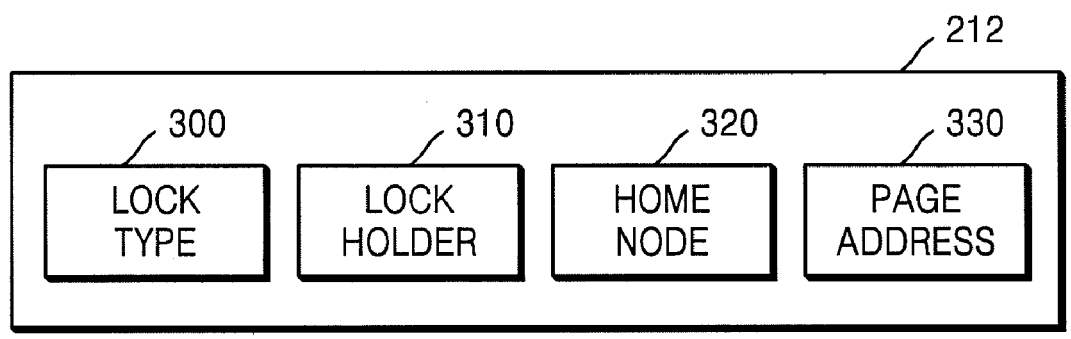
FIG. 3 illustrates entries of a block table 212 illustrated in FIG. 2.

FIG. 3 illustrates entries of the block table 212 illustrated in FIG. 2. Referring to FIG. 3, the entries of the block table include a lock type 300, a lock holder 310, a home node 320 and a page address 330.

The lock type represents a block-sharing state. The block sharing state includes idle, multiple reader and exclusive writer and it can be represented in 1 byte. The idle indicates that a corresponding block is not used by any domain, the multiple reader indicates that multiple domains have permission to read the corresponding block, and the exclusive writer indicates that only a specific domain has permission to write data to the corresponding block. In this manner, data consistency of a disk drive block can be maintained.

More specifically, block lock implements multiple reader single writer semantics in an embodiment of the present invention. That is, while multiple domains can simultaneously have read only permission, when write permission is required only exclusive copy is left and other block-sharing states are invalidated.

Substantial data of a block having read only permission exists in only a buffer cache of a specific domain and other domains access this buffer cache as a shared memory.

The lock holder 310 represents a bit field indicating a domain having block lock, that is, a bit field that indicates domains having block access permission. The lock holder 310 can be represented in 4 bytes. For example, the lock holder can represent domain IDs 0 through 31. A bit '1' represents that a domain having a domain ID corresponding to the position of the bit has block access permission.

The home node 320 represents a domain ID of a node having a cache page and it can be represented in 1 byte.

The page address 330 represents a physical page address of a cache page and it can be represented in 4 or 8 bytes.

Figure 4:
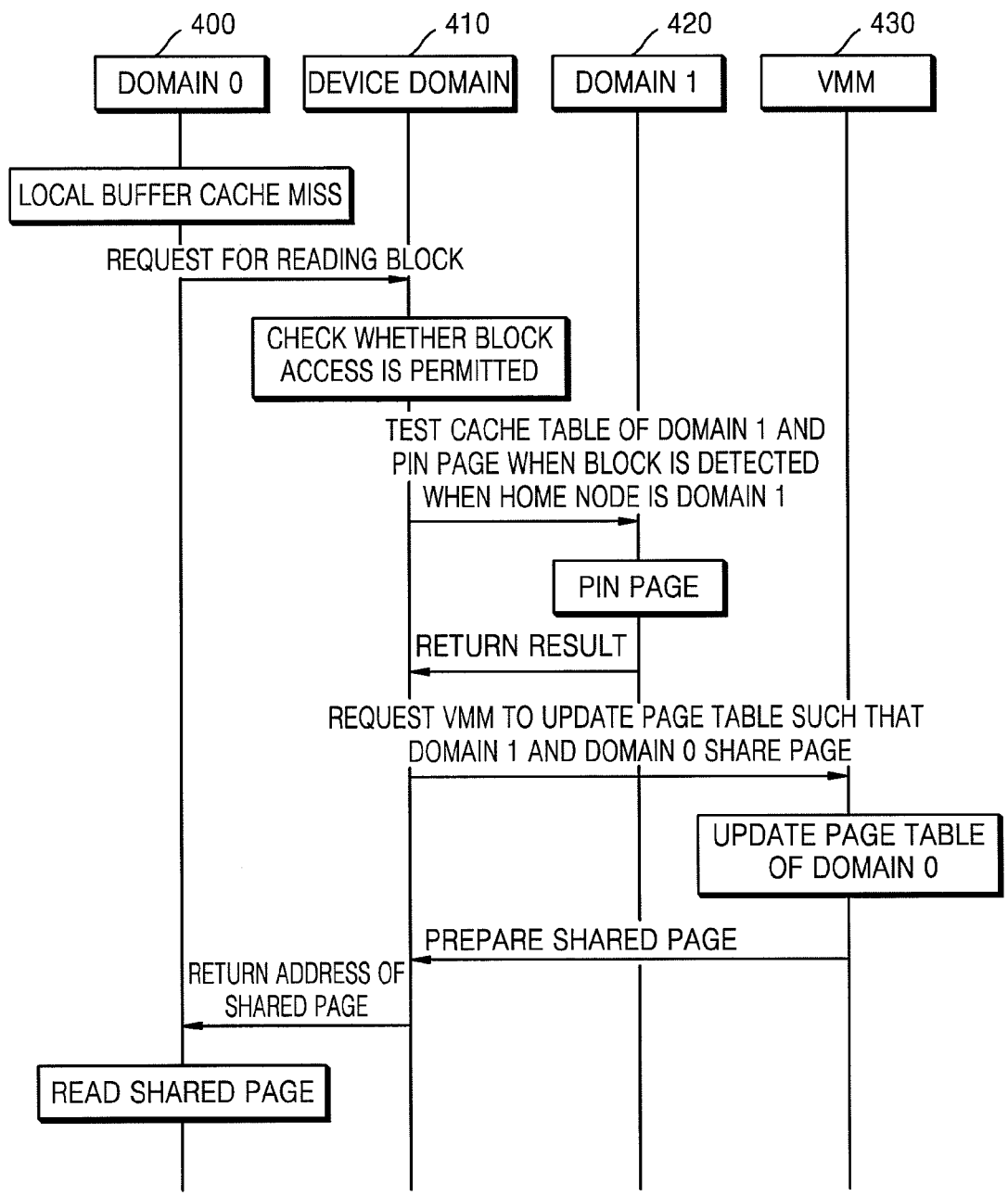
FIG. 4 illustrates a signal flow when a corresponding block is hit in a remote cache according to an embodiment of the present invention.

FIG. 4 illustrates a signal flow when a corresponding block is hit in a remote cache according to an embodiment of the present invention. Referring to FIG. 4, when the corresponding block is missed in a local buffer cache of a domain 0 400, the domain 0 400 requests a device domain 410 to read the corresponding block. The device domain 410 checks whether the domain 0 400 is permitted to access the corresponding block with reference to a block table. Here, lock type information of the block table is considered. That is, the device domain 410 checks whether the current state of the corresponding block is idle, multiple reader or exclusive writer. When the domain 0 400 is not permitted to access the corresponding block, the device domain 410 returns an error signal to the domain 0 400. When the domain 0 400 is permitted to access the corresponding block, the device domain 410 checks a home node of the block table. When home node information corresponds to a domain 1 420, the device domain 410 can presume that the domain 1 420 currently caches the corresponding block. Accordingly, the device domain 410 requests the domain 1 420 to test a buffer cache thereof and to pin the page of the corresponding block when the corresponding block is detected. The domain 1 420 checks its buffer cache and returns an error signal to the device domain 410 when the corresponding block does not exist in the buffer cache. When the corresponding block exists in the buffer cache of the domain 1 420, the domain 1 420 pins the page of the corresponding block and returns the result to the device domain 410.

The device domain 410 requests a virtual machine monitor 430 to update a page table such that the domain 0 400 and the domain 1 420 shares the page of the corresponding block. Here, hypercall from the device domain 410 to the virtual machine monitor 430 is used for the request for updating the page table for page sharing between nodes. The virtual machine monitor 430 updates the page table of the domain 0 400, returns the physical page address of the shared page to the device domain 410, and requests the device domain 410 to prepare for sharing the page. The device domain 410 returns the address of the shared page to the domain 0 400. Then, the domain 0 400 reads the shared page.

Figure 5:
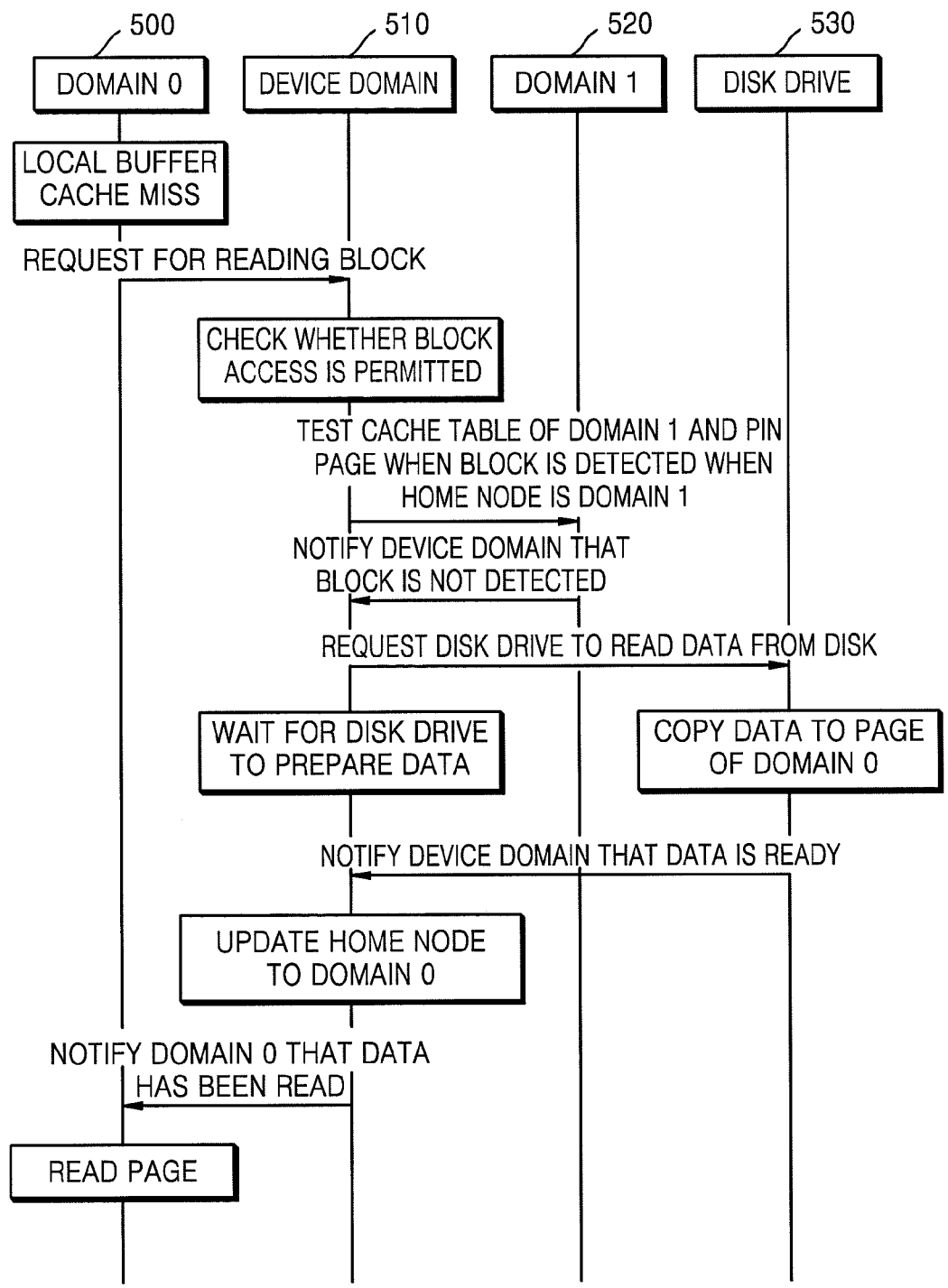
FIG. 5 illustrates a signal flow when a corresponding block is missed in a remote cache according to an embodiment of the present invention.

FIG. 5 illustrates a signal flow when the corresponding block is missed in the remote cache according to an embodiment of the present invention. Referring to FIG. 5, when the corresponding block is missed in a local buffer caches of a domain 0 500, the domain 0 500 requests a device domain 510 to read the corresponding block. The device domain 510 checks whether the domain 0 500 is permitted to access the corresponding block with reference to a block table. Here, lock type information of the block table is considered. That is, the device domain 510 checks whether the current state of the corresponding block is idle state, multiple reader or exclusive writer. When the domain 0 500 is not permitted to access the corresponding block, the device domain 510 returns an error signal to the domain 0 500. When the domain 0 500 is permitted to access the corresponding block, the device domain 510 checks a home node of the block table. When home node information corresponds to a domain 1 520, the device domain 510 can presume that the domain 1 520 currently caches the corresponding block. Accordingly, the device domain 510 requests the domain 1 520 to test a buffer cache thereof and to pin the page of the corresponding block when the corresponding block is detected. When the corresponding block is not stored in the buffer cache of the domain 1 520, that is, when the corresponding block is missed in the remote cache, the domain 1 520 notifies the device domain 510 that the corresponding block is not detected.

The device domain 510 requests a disk drive 530 to read a disk having the corresponding block. Here, the device domain 510 accesses the disk drive 530 through a native driver thereof. The device domain 510 waits for the disk drive 530 to prepare data of the corresponding block. The disk drive 530 copies the data of the corresponding block to the page of the domain 0 500, and then notifies the device domain 510 that the data of the corresponding block has been prepared. The device domain 510 updates the home node of the block table entry to the domain 0 500. Accordingly, it is corrected that the corresponding block currently belongs to the domain 0 500. When the disk block is directly accessed as described above, corresponding node information is recorded as a home node in the block table and a corresponding page address is registered in the block table. The registered page means cache copy only. Subsequently, the device domain 510 notifies the domain 0 500 that it has read the data of the corresponding block. Then, the domain 0 500 reads the page of the corresponding block.

Figure 6:
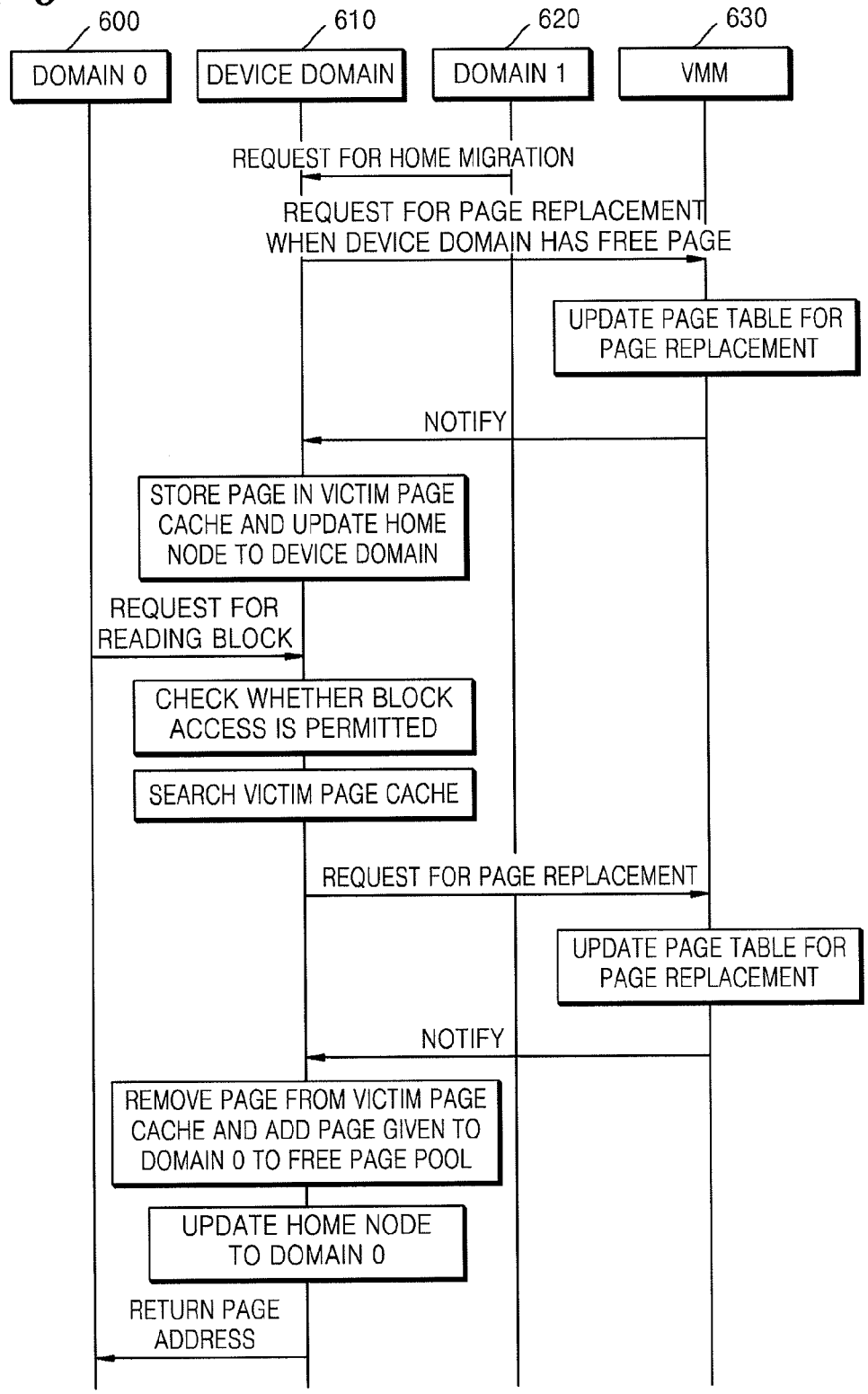
FIG. 6 illustrates a signal flow for explaining home migration according to an embodiment of the present invention.

FIG. 6 illustrates a signal flow for explaining home migration according to an embodiment of the present invention. Referring to FIG. 6, a domain 1 620 requests a device domain 610 to execute home migration. That is, when replacement of the page of a block is required, the domain 1 620 requests the device domain 610 to re-register a block table. If the device domain 610 has a free page, the domain 1 620 requests a virtual machine monitor 630 to replace the page. When a victim page cache has no available page, a single page is replaced. The contents of the victim page cache are identical to the contents of the disk, and thus the victim page cache does not perform data flush when replacing the page. The virtual machine monitor 630 updates the page table for page replacement and notifies the device domain 610 of it. The device domain 610 stores the corresponding page in the victim page cache and updates a home node of the block table to the device domain 610.

When a domain 0 600 requests the device domain 610 to read a block, the device domain 610 checks whether the domain 0 600 is permitted to access the block and searches the victim page cache thereof because the home node of the block corresponds to the device domain. The device domain 610 requests the virtual machine monitor 630 to replace a page. Then, the virtual machine monitor 630 updates the page table for page replacement and notifies the device domain 610 of it.

The device domain 610 removes the corresponding page from the victim page caches and adds the page given to the domain 0 600 to a free page pool. Then, the device domain 610 updates the home node of the block table to the domain 0 600 and returns the address of the corresponding page to the domain 0 600.

FIG. 7 illustrates a signal flow for explaining block lock according to an embodiment of the present invention. Block lock states include idle state, multiple reader and exclusive writer. The block lock implements multiple reader single writer semantics. That is, while multiple domains can simultaneously have read only permission, when write permission is required only exclusive copy is left and other block-sharing states are invalidated. Substantial data of a block having read only permission exists in only a buffer cache of a specific domain and other domains access this buffer cache as a shared memory.

A block lock request sent to a device domain includes Get_Reader_Lock, Get_Exclusive_Writer_Lock, Put_Reader_Lock, Put_Exclusive_Writer_Lock, Downgrade_to_Reader_Lock, and Upgrade_to_Exclusive_Writer_Lock. When the device domain 710 receives the block lock request, the device domain searches a block table for a corresponding block table entry. The block table entry includes a field representing whether the requested lock of the corresponding block is permitted, and the device domain confirms whether the requested lock can be permitted with reference to the field. When the requested lock can be permitted, the device domain updates the field to correct the block table entry and returns the result to the OS domain that transmits the request.

Referring to FIG. 7, when a domain 1 720 needs Get_Reader_Lock, the domain 1 720 requests a device domain 710 to execute block lock. The device domain 710 searches a block table and, when the current state of a corresponding block is idle, notifies the domain 1 720 of it. When the domain 0 700 needs Get_Reader_Lock, the domain 0 700 requests the device domain 710 to execute block lock. The device domain 710 searches the block table, confirms that the current state of the corresponding block is multiple reader and notifies the domain 0 700 of it.

When the domain 0 700 requires write lock, the domain 0 700 requests the device domain 710 to upgrade the multiple reader that can be currently allowed to the domain 0 700 to exclusive writer. Then, the device domain 710 requests a domain 1 720 currently having reader state for the corresponding block to execute unlock. When the domain 1 720 notifies the device domain 710 that unlock has been executed, the device domain 710 updates the corresponding block to exclusive writer and notifies the domain 0 700 of it.

When the domain 1 720 requires reader lock again, the domain 1 720 requests the device domain 710 to execute block lock. Then, the device domain 710 requests the domain 0 700 having exclusive writer permission for the corresponding block to downgrade the exclusive writer to reader block. Then, the domain 0 700 may selectively flush the corresponding block stored in the buffer cache thereof to a disk drive. When the domain 0 700 transmits acknowledgement to the device domain 710, the device domain 710 upgrades the block lock type of the block table to multiple reader state and sends return acknowledgement to the domain 1 720.

As described above, data consistency of a disk drive block can be maintained under the control of the device domain 710.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, the present invention receives a disk block access request from an OS domain, determines whether the OS domain is permitted to access a disk block with reference to a predetermined block table and processes disk block access of the OS domain according to the determination result. Accordingly, OS domains can share caches without having data copy through memory access control in a virtual machine monitor environment. Furthermore, a device domain controls access to a disk drive so that data corruption can be prevented.

What is claimed is:

1. A method for processing an Operating System (OS) domain access to a disk block in an environment in which at least one OS domain is executed on a virtual machine monitor, the method comprising:

receiving, by a device domain, a disk block access request from a first OS domain corresponding to a first OS;

determining, by the device domain, whether the first OS domain is permitted to access the disk block with reference to a block table to generate a determination result; and processing, by the device domain, an access of the disk block by the first OS domain according to the determination result, wherein the processing comprises:

when the access from the first OS domain is not permitted, returning an error signal to the first OS domain, and when the access from the first OS domain is permitted, confirming, by the device domain, whether the requested disk block exists in a buffer cache of a second OS domain corresponding to a second OS, different from the first OS, and accessing, by the device domain, a disk drive when the requested disk block does not exist in the buffer cache of the second OS domain, and wherein the device domain is accessible by the first OS domain and the second OS domain to provide access to the disk drive.

2. The method of claim 1, further comprising sharing the disk block stored in the buffer cache of the second OS domain with the first OS domain according to the determination result.

3. The method of claim 1, wherein the block table includes a home node representing an OS domain of a node having a cached page for the disk block, and the processing of the access of the disk block comprises requesting an OS domain corresponding to the home node to test a buffer cache of the OS domain corresponding to the home node.

4. The method of claim 3, wherein, if the disk block is cached in the OS domain corresponding to the home node, the processing of the access of the disk block comprises:

requesting the virtual machine monitor to update a page table of the first OS domain such that the first OS domain and the OS domain corresponding to the home node share the page of the disk block; and returning the address of the shared page to the first OS domain.

5. The method of claim 1, wherein the accessing the disk drive comprises accessing the disk drive to make disk drive copy data of the disk block to a page of the first OS domain.

6. The method of claim 5, wherein the disk drive is accessed using a native driver.

7. The method of claim 1, wherein the block table includes a lock type representing a shared state of the disk block.

8. The method of claim 7, wherein the lock type includes idle, multiple reader and exclusive writer.

9. The method of claim 1, wherein the block table includes a lock holder representing OS domains having permission to access the disk block.

10. The method of claim 1, wherein the block table includes a lock type, a lock holder, a home node and a page address of the disk block.

11. The method of claim 1, wherein the disk block access request is a request for permission to read/write data from/to the disk block.

12. A computer readable recording medium storing instructions for causing a computer executing the instructions to perform the method of claim 1.

13. A method of processing a disk block access, the method comprising:

requesting from a device domain, by a first OS domain corresponding to a first OS, access to a disk block;

in response to the requesting from the device domain, requesting, by the device domain, a second OS domain corresponding to a second OS, different from the first OS, to check whether a buffer cache thereof caches the disk block with reference to a predetermined block table;

requesting, by the device domain, a virtual machine monitor to update a page table of the first OS domain such that the first OS domain and the second OS domain caching the disk block in the buffer cache thereof share the page of the disk block according to the checking result; and returning, by the device domain, the address of the shared page of the disk block to the first OS domain, wherein the device domain is accessible by the first OS domain and the second OS domain to provide access to the disk drive.

14. A system for processing an Operating System (OS) domain access to a disk block in an environment in which at least one OS domain is executed on a virtual machine monitor, the system comprising:

a hardware component; and a device domain receiving a disk block access request from a first OS domain corresponding to a first OS, determining whether the first OS domain is permitted to access the disk block with reference to a block table to generate a determination result, and processing an access of the disk block by the first OS domain according to the determination result, wherein, when the access from the first OS domain is not permitted, the device domain returns an error signal to the first OS domain, and when the access from the first OS domain is permitted, the device domain confirms whether the requested disk block exists in a buffer cache of a second OS domain corresponding to a second OS, different from the first OS, and accesses a disk drive when the requested disk block does not exist in the buffer cache of the second OS domain, wherein the device domain is executed by the hardware component, and wherein the device domain is accessible by the first OS domain and the second OS domain to provide access to the disk drive.

15. The system of claim 14, wherein the device domain comprises a block table that includes at least one of a lock type, a lock holder, a home node and a page address of the disk block.

16. The system of claim 14, wherein, if the disk block is cached in the second OS domain, the device domain requests the virtual machine monitor to update a page table of the first OS domain such that the first OS domain shares the page of the disk block and returns the address of the shared page to the first OS domain according to update of the page table.

17. The system of claim 14, wherein, when the disk block is not cached in the second OS domain, the device domain accesses the disk drive to make the disk drive copy data of the disk block to a page of the first OS domain.

18. The system of claim 14, wherein the device domain comprises:

a back-end driver communicating with a front-end driver of the first OS domain through an event channel of the virtual machine monitor; and a native driver accessing the disk drive.

19. The system of claim 14, wherein the device domain comprises a victim page cache that copies data of a page that is to be replaced from an arbitrary OS domain.

20. The system of claim 14, wherein the disk block access request is a request for permission to read/write data from/to the disk block.

* * * * *